March 12, 1968  E. S. BAKER  3,373,290
POLYPHASE CURRENT CONTROL SYSTEM
Filed Dec. 13, 1965  3 Sheets-Sheet 1

INVENTOR.
EDWARD S. BAKER
BY
Orland N. Christensen
ATTORNEY

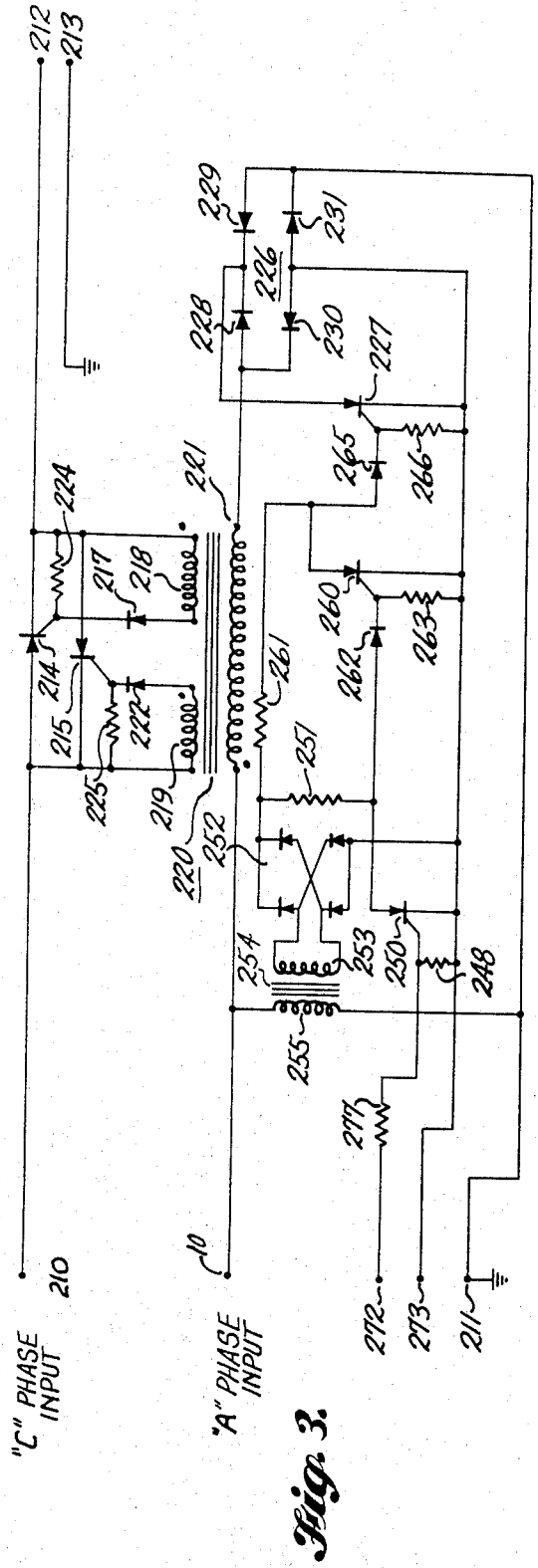

March 12, 1968

E. S. BAKER 3,373,290

POLYPHASE CURRENT CONTROL SYSTEM

Filed Dec. 13, 1965

INVENTOR.
EDWARD S. BAKER
BY
Orland M. Christensen
ATTORNEY

United States Patent Office 3,373,290
Patented Mar. 12, 1968

3,373,290
POLYPHASE CURRENT CONTROL SYSTEM
Edward S. Baker, Seattle, Wash., assignor to The Boeing Company, Seattle, Wash., a corporation of Delaware
Continuation-in-part of application Ser. No. 444,196, Mar. 31, 1965. This application Dec. 13, 1965, Ser. No. 513,452
14 Claims. (Cl. 307—133)

ABSTRACT OF THE DISCLOSURE

A system is disclosed for controlling a polyphase power supply in a manner to insure that power from each phase is initially applied to a load under zero voltage conditions. The application discloses one such system wherein controlled rectifiers such as silicon controlled rectifiers are connected in series circuit arrangement between each phase of the power supply and the load with the gating signals for the various controlled rectifiers being derived from the various phases in a manner which prevents initial turn on of power except under zero voltage conditions. In a three phase example the A phase controlled rectifiers are gated from B phase voltage, the B phase rectifiers are gated from the C phase, and the C phase gated from the A phase voltage. The gating circuits include zero voltage detection circuits and are so interconnected that the succeeding phases can turn on only after the circuitry for the preceding phase has been properly actuated. Thus a single input control network coupled with one of the phases serves to control all three phases.

---

This application is a continuation-in-part of U.S. patent application Ser. No. 444,196 (now abandoned) filed Mar. 31, 1965, entitled, "Polyphase Current Control System."

The present invention relates to apparatus and systems for the control of the flow of electric current from a source to a load and more particularly to an improved current control system for a polyphase voltage source adapted to respond to an input control signal to cause the initial application of power to a load at a time when each of the voltage wave-forms for the various phases of the power supply are crossing a zero reference axis.

In the control of the flow of current from a power supply to a given load it is many times advantageous and, in fact necessary, to provide power to the load at a time when the voltage wave-form is crossing a zero reference axis. In the use of polyphase power supplies it would be advantageous to be able to have a simple system for controlling the flow of current from the power supply to a load in a manner such that regardless of when a control signal was applied to the control system, power would be initially applied to the load at a time when the voltage wave-forms for each phase was crossing a zero reference axis. Thus, disturbances of the load caused by the initial application of power when the power supply voltage was other than at zero would be eliminated. In such a polyphase power control system it would be further advantageous if the control network for the various phases could be made to utilize the out-of-phase characteristic of the polyphase system for the control of the individual phases.

It is therefore an object of the present invention to provide an improved polyphase power control system.

It is another object of the present invention to provide a control system for a polyphase power supply making use of solid-state devices having no moving parts.

Another object of the present invention is to provide a simplified polyphase power control system adapted to cause the initial application of power to a load at a time when the voltage wave-form of the selected phase of the polyphase system is crossing a zero reference axis and to then thereafter sequentially permit the application of power from the various other phases only at a time when the voltage wave-form for each phase is crossing a zero reference axis.

Another object of the present invention is to provide a control system for controlling the application of power from a polyphase power supply to a load in a manner such that control signals for one phase are derived from another phase to thus reduce the components required for accurate system control and yet provide a system wherein power is applied to the load initially at a time when various voltage wave-forms in the polyphase system are crossing their respective zero reference axes.

Another object of the present invention is to provide a simplified control system for controlling the application of power from a polyphase power supply to a load and wherein a common signal ground is utilized for the polyphase power supply and the control source which applies a control signal to the control system.

An additional object of the present invention is to provide a three phase solid-state relay network responsive to an applied control signal to cause the initial application of power from a three phase power supply to a load at a time when a first phase of the power supply is crossing a zero reference axis and to then thereafter cause the sequential application of power from each of the phases to the load when each of said remaining phases is crossing a zero voltage reference axis.

These and other objects of the present invention are achieved through the use of a novel circuit arrangement making use of solid-state current switching devices such as controlled rectifiers connected in series circuit arrangement between the output of a polyphase power supply and the input to a load in a manner such that the flow of current to the load from each of the various phases of the polyphase power supply is controlled by one or more of the controlled rectifiers. Gating signals for the controlled rectifiers of the first phase of the polyphase system are derived from a second phase of the system and in a manner such that the gate signals are initially provided at a time to cause initial current flow to the load when the voltage wave-form of the first phase is crossing a zero reference axis. The out-of-phase relationship between the first and second phases of the polyphase system is used to advantage so that rapid turn-on of the controlled rectifiers is assured. A direct current control network is included with the control apparatus for the first phase in a manner such that when a direct current control signal is applied to a pair of input terminals for the first phase of the system said first phase will be rendered operable for the application of power to the load when the voltage of the first phase next crosses its zero reference axis. To this end a zero voltage sensing network is coupled with the first phase input to serve as a master control for the initial application of power to the load.

In a similar manner gating signals for the controlled rectifiers of the second phase are obtained from the third phase (in a three phase power supply system) with initial gating of the controlled rectifiers in the second phase being permitted only after the initial application of gating signals to the controlled rectifiers of the first phase. The control circuitry for the second phase also includes a zero voltage sensing network which cooperates with the control signals from the first phase in a manner such that power is provided by the second phase only at a time when the voltage wave-form thereof is crossing a zero reference axis. In a substantially identical manner the controlled rectifiers in series circuit with the third phase of a three phase system are provided with gating signals through transformer action and power derived from the first phase with the timing of the initial application of gating signals to the controlled rectifiers in the third phase being derived from the second phase control network and a zero voltage detecting circuit.

The circuit arrangement is materially simplified in that a single direct current control signal is applied to the first phase of the system for causing initial application of power to a load by the first phase and then thereafter the additional phases in the polyphase system are sequentially controlled by the associated preceding phases so that power is provided from each phase at a time when the voltage wave-form thereof is crossing its zero reference axis. Thus disturbances to the load are effectively eliminated. When the control signal for the first phase is removed the first phase power becomes disconnected from the load and then thereafter each of the various phases becomes disconnected from the load as a result of the associated controlled rectifiers no longer being provided with gating signals from the preceding phases.

The above as well as additional advantages and objects of the present invention will be more clearly understood from the following description when read with reference to the accompanying drawings and wherein, FIGURE 1 is a schematic circuit diagram of the A phase portion of a solid-state current control system adapted for controlling a three phase power supply in accordance with the present invention;

FIGURE 3 is a schematic circuit diagram of the C phase control network for the three phase system shown for teaching the present invention and cooperating with the circuits of FIGURES 1 and 2;

While the teachings of the present invention can be adapted to power supply systems having various numbers of voltage phases, the specific system shown for purpose of illustration is that which is primarily adapted for use with a conventional three phase power supply system commonly referred to as having A, B, and C phases each displaced by 120 degrees from the others. The individual circuits shown in FIGURES 1, 2 and 3 are in practice interconnected to provide a complete polyphase power supply control system.

Figure 1:
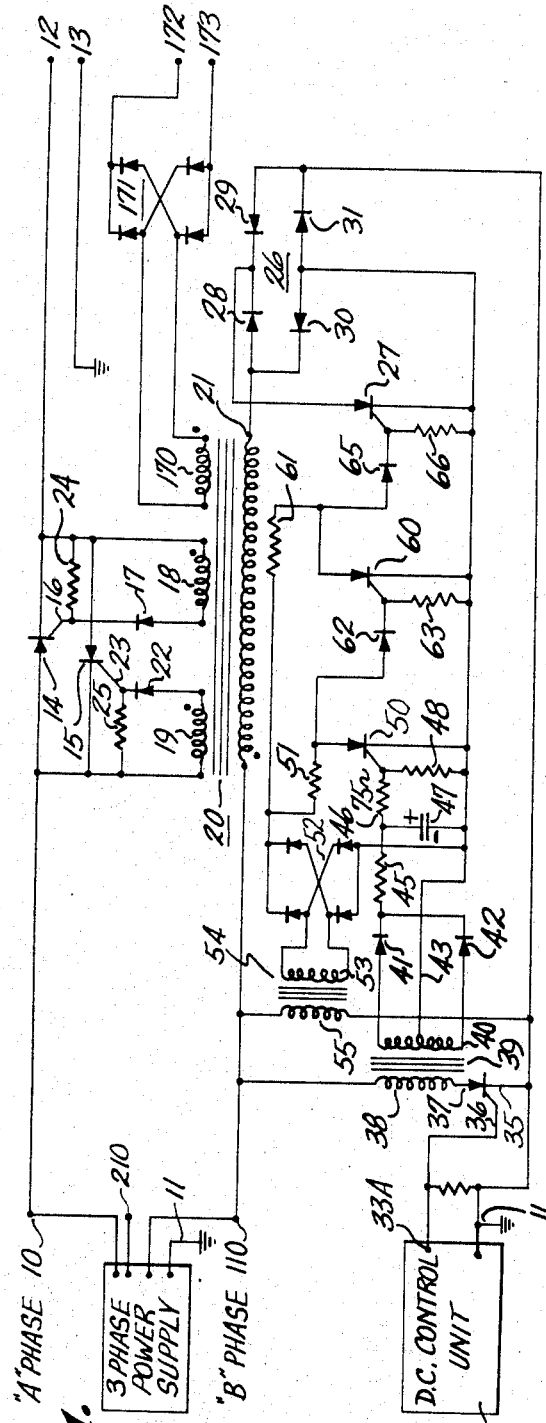
Figure 2:
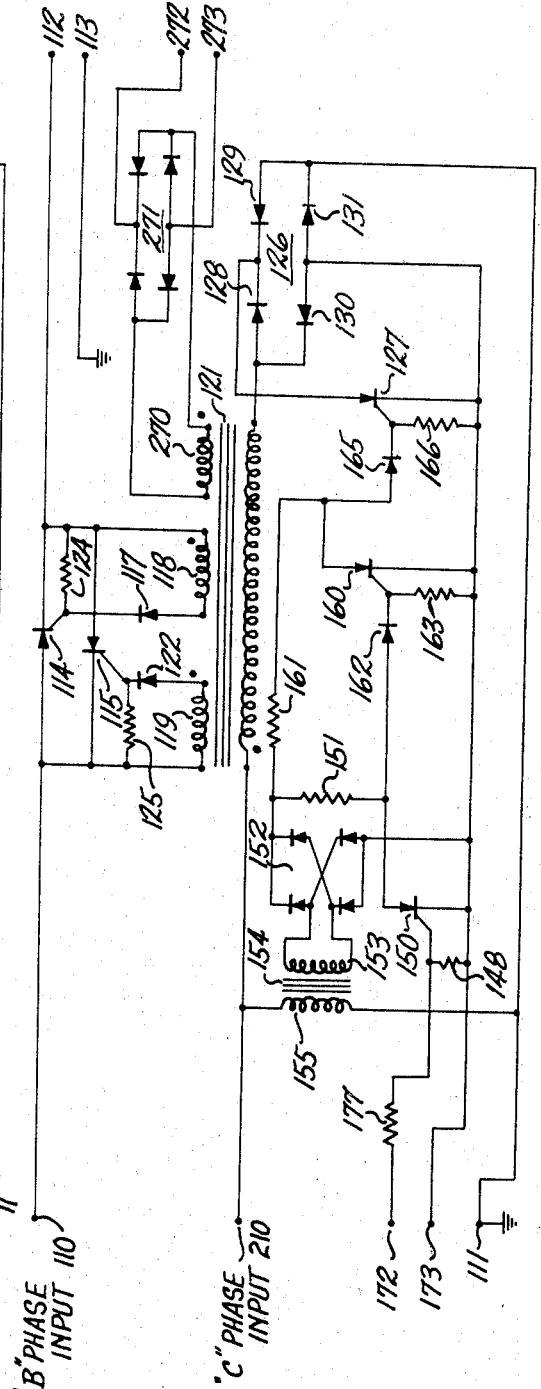
FIGURE 2 is a schematic circuit diagram of the B phase control network of the three phase control system.

Referring now to the drawings and in particular to FIGURE 1, the control circuitry for the A phase of a three phase power supply system is illustrated. An input terminal 10 is adapted to receive the A phase voltage from a three phase power supply 9. The other input terminal 11 serves as a common input terminal for each of the phases and is referred to as ground. The A phase output terminals are shown at 12 and 13. A pair of current control devices shown as silicon controlled rectifiers (SCR's) 14 and 15 are connected between the terminals 10 and 12 and thus serve to control the flow of current to the A phase output terminals. It will be seen that the SCR's 14 and 15 are connected in opposite polarity so that full wave current control is provided. As is well known in the art, the SCR's 14 and 15 have the characteristic that even though the anode thereof is made positive with respect to the cathode no current flows through the device unless the control (or gate) electrode is provided with a signal positive with respect to the cathode potential. However once the controlled rectifier has been rendered conductive, the control signal on the gate electrode thereof can be removed without affecting the state of conduction of the rectifier since it then remains conductive so long as the anode remains positive with respect to the cathode thereof. Then when the anode is no longer positive with respect to the cathode the device becomes nonconductive. In the circuit shown in FIGURE 1 it will be seen that the gate electrode 16 of SCR 14 is connected through a diode 17 to the secondary winding 18 of a transformer 20 having a primary winding 21. In a similar manner a second secondary winding 19 of the transformer 20 is connected through a diode 22 to the gate electrode 23 of SCR 15. Bias resistors 24 and 25 will be seen to be connected between the respective gate electrodes and cathodes of the SCR's 14 and 15. The circuit arrangement is such that the SCR's 14 and 15 are normally maintained nonconductive unless an appropriate gating signal is provided thereto as a result of current flow through the primary winding 21 of the transformer 20.

It will be seen in FIGURE 1 that one end of the transformer primary winding 21 is connected to the input terminal 110 to which the B phase voltage of the three phase power supply is connected. The other end of the primary winding 21 is connected through a diode network 26 to the anode of an SCR 27 which has its cathode connected to common ground through diode 31. The SCR 27 has its anode connected directly to the cathodes of the diodes 28 and 29 and its cathode connected directly to the anodes of the diodes 30 and 31 with the anode of diode 29 and the cathode of diode 31 being connected by lead 32 to common ground. The arrangement is such that as long as the SCR 27 is maintained nonconductive neither of the main current control SCR's 14 or 15 will be provided with a gating signal. When SCR 27 is rendered conductive it will be seen that current flow will then be provided through the primary winding 21 and hence one or the other of the SCR's 14 or 15 will be provided with gating current, the particular one of the two which is initially provided with gating current being described in greater detail hereinafter. The state of conduction of the SCR 27 is controlled by a control circuit responsive to the signal level on the output terminals of a DC control unit shown diagrammatically as the control unit 33.

The control circuit for the SCR 27 includes a semiconductor current switching device shown for purpose of illustration as a silicon controlled rectifier 35 having a gate electrode 36 connected to the non-grounded terminal 33A of the DC control unit 33. The cathode of SCR 35 is connected to the other terminal of control unit 33 so that the state of conduction of SCR 35 is under the control of the DC control unit 33. The anode 37 is connected to the B phase terminal through the primary winding 38 of a transformer 39 which has a center tapped secondary 40. The ends of secondary winding 40 are connected by diodes 41 and 42 and resistors 45 and 46 to the gate electrode of an SCR 50. The center tap 43 is connected to the cathode of SCR 50.

A capacitor 47 is connected between the junction of resistors 45 and 46 and the cathode of SCR 50, said capacitor preferably being of the polarized type such as a readily available tantalum capacitor. A bias resistor 48 is connected between the gate and cathode electrodes of the SCR 50. The arrangement is such that when SCR 35 is placed in a condition for conduction by control unit 33 the transformer primary 38 will be energized. The secondary winding and capacitor arrangement will then provide a continuing gate signal to SCR 50 even though SCR 35 conducts only on alternate half cycles of the B phase voltage.

The SCR 50 is part of a zero sensing control network which insures intial turn-on of the A phase power to the load at a time when the A phase voltage is crossing the zero voltage reference axis. The anode of SCR 50 is connected through resistor 51 and a full wave rectifier network 52 to the secondary winding 53 of a transformer 54 which has its primary winding 55 connected directly across the B phase input terminals. The arrangement is such that anode of the SCR 50 will be provided with full wave rectified B phase voltage. An SCR 60 has its anode connected through a resistor 61 and the full wave rectifier circuit 52 to the secondary winding 53. The anode of SCR 50 is connected through the diode 62 to the gate electrode of SCR 60, said gate electrode of SCR 60 being connected through the bias resistor 63 to the cathode of SCR 60. In a similar manner the anode of SCR 60 is connected through diode 65 to the gate electrode of SCR 27 which in turn has its gate and cathode electrodes interconnected by the bias resistor 66.

It will be seen that as long as the SCR 27 remains nonconductive the necessary current flow through the transformer primary winding 21 for rendering one or the other of SCR's 14 or 15 conductive will be prevented and hence no power is applied to the load from the A phase input. The transformer 20 is a step-down transformer so that gating voltages of a few volts are applied to the SCR's 14 and 15 when the full B phase voltage is applied across the primary winding 21.

When power is to be applied to the load the terminal 33A of the DC control unit 33 is provided with a positive voltage to place SCR 35 in a condition for conduction. The operation of the circuit of FIGURE 1 when current is to be provided to the load will be best understood by reference to the voltage wave-forms of FIGURES 4A and 4B. Since the primary winding 55 of transformer 54 is connected across the B phase input terminals it will be seen that the SCR 60 will normally be conductive prior to the application of a control signal from the DC control 33 since prior to that time there is no gate signal for SCR 50. The SCR 60 conducts since the rectified voltage from the full wave rectifier network 52 is simultaneously applied through the resistor 51 and diode 62 to the gate of SCR 60 and through the resistor 61 to the anode of SCR 60. The conduction of SCR 60 serves to effectively clamp the gate electrode of SCR 27 to the voltage of the cathode of SCR 27 and hence prevents conduction of SCR 27.

Figure 4A:
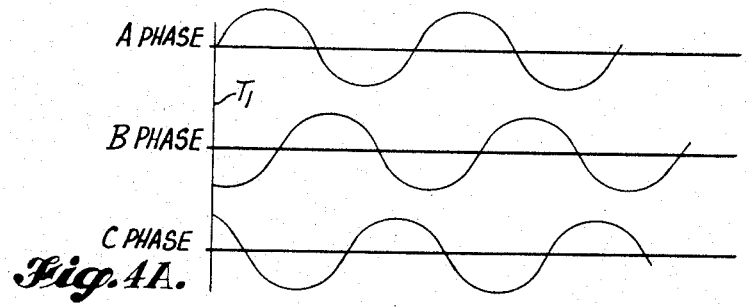
FIGURE 4A is an illustration of the voltage waveforms for the three phases of the power supply system used with the polyphase control network shown in FIGURES 1, 2 and 3.
Figure 4B:
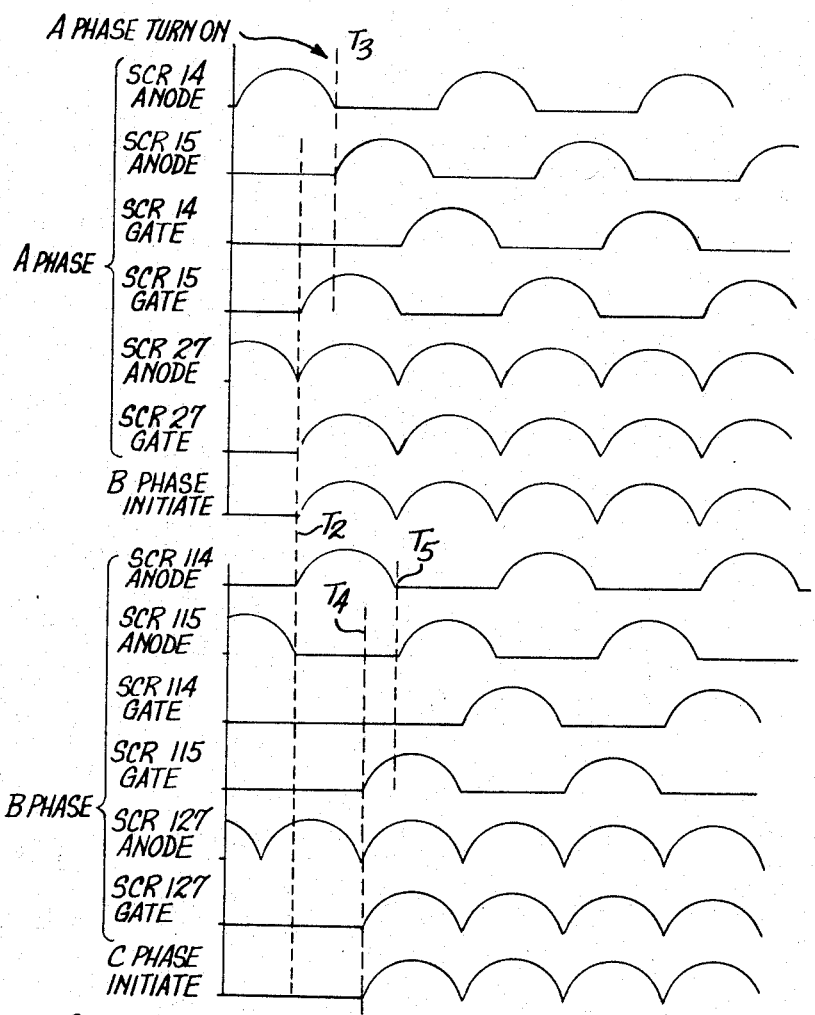
FIGURE 4B is an illustration of various voltage waveforms occurring in the circuits of FIGURES 1 and 2.

It should be noted in FIGURE 4A that the B phase voltage lags the A phase voltage by 120 degrees. However it should be further noted in FIGURE 1 that the secondary windings on the transformer 20 which are coupled with the gate electrodes of SCR's 14 and 15 are so wound that the voltages thereon are effectively 180 degrees out of phase with respect to the primary voltage across the primary winding 21 when the full voltage of the B phase input is applied thereto. This results in the gate voltages for the SCR's 14 and 15 effectively leading the A phase anode voltages applied to SCR's 14 and 15 by 60 degrees. This will be seen from FIGURE 1 if one considers that when the B phase input terminal 110 is going positive with respect to ground the gate electrode for SCR 15 is provided with a gating signal, whereas when the B phase input terminal 110 goes negative with respect to signal ground the gate electrode for SCR 14 is provided with a gating signal. This is shown by the anode and gate electrode voltage wave-forms of FIGURE 4B.

As noted above, the repeated conduction of SCR 60 serves to maintain SCR 27 nonconductive and hence prevents the application of gating current to SCR's 14 and 15. When power is to be applied to the load, the D.C. control unit 33 applies a positive signal to the gate electrode of SCR 35, as for example at time $T_1$ in FIGURES 4A and 4B. At time $T_1$ the B phase voltage is negative and therefore conduction of SCR 35 is delayed until time $T_2$ when the anode of SCR 35 goes positive. At time $T_2$ current flow in the primary winding 38 of transformer 39 induces a gating voltage in the secondary 40 which is applied to the gate of SCR 50. This renders SCR 50 conductive so that the gate of SCR 60 is clamped to its cathode and hence remains nonconductive as the B phase voltage crosses the zero axis and goes positive. As a result SCR 27 conducts and gating signals are induced in the winding 19 connected to the gate of SCR 15. However at time $T_2$ the anode of SCR 15 has not yet gone positive and therefore conduction of SCR 15 is delayed until time $T_3$ when the A phase voltage passes through zero. Since the gate of SCR 15 is provided with a signal well in advance of time $T_3$ SCR 15 turns on very near the zero axis in a substantially noiseless manner.

It should be noted that the time $T_1$ was selected at random to illustrate that the time of application of the input control signal to SCR 35 does not alter proper operation of the circuit. For example, if the signal is applied to SCR 35 at a time when the B phase voltage is positive so that SCR 35 turns on immediately, the conduction of SCR 50 still would not affect the condition of SCR 60 until the B phase voltage next passed through zero. Since the SCR 60 only becomes nonconductive at a time when the B phase voltage passes through zero it will be seen that the time of application of the input signal and initial conduction of SCR 50 is immaterial. Once the SCR 50 is rendered conductive the capacitor 47 and center tap arrangement of the secondary winding 40 insures continued conduction thereof during the subsequent alternate half cycles of the B phase voltage when SCR 35 is nonconductive. Thus A phase power will continue to be applied to the terminals 12 and 13 as long as the D.C. control unit holds SCR 50 conductive.

Referring now to FIGURES 1 and 2 the manner in which the B phase power is applied to the B phase output terminals will be described. In FIGURE 2 it will be seen that a major portion of the circuit arrangement is substantially identical to that of FIGURE 1, and therefore in FIGURE 2 those components which are to be connected to and in practice are the same parts as those shown in FIGURE 1 bear the same reference numeral. In FIGURE 2 those components for the B phase control which operate in a manner similar to corresponding parts in the circuit of FIGURE 1 bear similar reference numerals increased by a factor of 100. Thus in FIGURE 2 the SCR's 114 and 115 operate in a manner similar to that of the SCR's 14 and 15 but in FIGURE 2 are shown as controlling the application of B phase power to the B phase output terminals 112 and 113. The primary winding 121 of the transformer 120 of FIGURE 2 will be seen to be connected to the C phase input terminal 210 and also through the full wave rectifier network 126 to the anode of a control SCR 127 so that the flow of gating current in the secondary windings 118 and 119 for the SCR's 114 and 115 will be controlled by the state of conduction of the SCR 127. An SCR 160 has its anode connected through the resistor 161 and the full wave rectifier network 152 to the secondary winding 153 of the transformer 154 having its primary connected directly across the C phase input terminals. The SCR 160 is therefore normally conductive and hence by having its anode connected through the diode 165 to the gate electrode of the SCR 127 serves to maintain SCR 127 normally nonconductive. In a manner similar to that described with reference to FIGURE 1, the SCR 150 will be seen to be connected in parallel with the SCR 160 with the anode of SCR 150 being connected through the diode 162 to the gate electrode of SCR 160 so that when the SCR 150 is rendered conductive it will operate to hold the SCR 160 nonconductive the next time the B phase input voltage crosses the zero reference axis following the start of conduction of the SCR 150. The state of conduction of the SCR 150 is controlled in the following manner.

The transformer 20 of FIGURE 1 has a third secondary winding 170 which is connected through the full wave rectifier network 171 to the B phase control terminals 172 and 173. The B phase control terminal 172 is connected through resistor 177 to the gate electrode of SCR 150 and through resistor 148 back to electrode 173. Thus when winding 170 is energized SCR 150 will be rendered conductive and serve to hold SCR 160 nonconductive the next time the C phase voltage passes through zero. This in turn will permit conduction of SCR 127, which occurs at time $T_4$ in FIGURES 4A and 4B. That is, when SCR 27 conducts at $T_2$ as described previously, a B phase initiate signal is induced in secondary 170 and a positive gate signal is applied via terminal 172 to SCR 150 in the B phase control (FIGURE 2). Thus SCR 150 turns on but since SCR 160 is already conducting at time $T_2$ the gate of SCR 127 remains clamped to its cathode and SCR 127 remains nonconductive. Then at time $T_4$ as the C phase voltage passes through zero SCR 160 will become nonconductive and SCR 127 will conduct and cause a gate signal to be applied to SCR 115. Since the anode of SCR 115 does not go positive until time $T_5$ the conduction of SCR 115 is delayed until the B phase voltage passes through zero at time $T_5$. Thus B phase power is initially applied to a load connected to terminals 112 and 113 at a time when the B phase voltage is passing through zero. Since SCR 27 remains conductive as described above, SCR's 14 and 15 will conduct alternately and in a similar manner SCR 127 will continue to conduct and cause SCR 114 and SCR 115 to conduct on alternate cycles of the B phase voltage.

The C phase control portion of the polyphase control system is illustrated in FIGURE 3 and is substantially identical to that of FIGURE 2 for the B phase. The similar components in FIGURE 3 bear reference numerals increased by a factor of 100 over those for the similar components in FIGURE 2. Thus it will be seen in FIGURE 3 that the C phase control includes a pair of heavy duty current control SCR's 214 and 215 connected between the C phase input terminal 210 and the C phase output terminal 212. In the circuit of FIGURE 3 it should be noted that the transformer 220 has its primary winding 221 connected to the A phase input terminal 10 and through the diode network 226 and SCR 227 to signal ground. Thus the gating signals for the SCR's 214 and 215 are derived from current flow through the primary winding 221 provided by the A phase of the main power supply. Referring to FIGURE 2 it will be seen that the transformer 120 has a third secondary winding 270 which is connected through the full wave rectifier network 271 to the C phase control terminals 272 and 273 which are also to be seen in FIGURE 3 as being connected in control relationship with respect to the SCR 250 which operates in a manner substantially identical to that described for the SCR 150 in FIGURE 2. It will be seen in FIGURE 3 that the primary winding of transformer 254 is connected directly across the A phase input terminals. The SCR 260 normally maintains SCR 227 nonconductive until such time as the C phase control terminals 272 and 273 are energized by the winding 270 to cause SCR 250 to conduct. Then thereafter when the C phase voltage next reaches zero SCR 260 is held nonconductive by the conduction of SCR 250 and hence SCR 227 is rendered conductive and current flows from the A phase input terminal 10 through the primary winding 221. Appropriate gating signals for the C phase main power control SCR's 214 and 215 are thus provided. The C phase power is therefore initially applied to the load at a time when the C phase voltage is at zero in a manner substantially identical to that described with reference to FIGURE 2 for the B phase power control. While not shown in FIGURE 4B it will be evident from the waveforms shown for the B phase control that the C phase power is applied to the load 120 degrees later than the time $T_5$ when the B phase power is applied to the load.

As is well known in the art, once a silicon controlled rectifier has been rendered conductive it remains conductive until the anode is no longer positive with respect to the cathode. Thus once the system described above has been operated by the DC control unit to apply power to the load, such application of power will continue so long as the DC control unit maintains the SCR 50 of FIGURE 1 conductive. After the positive voltage of the DC control unit 33 is removed the circuit returns to its original condition with each of the main current carrying SCR's 14, 15, 114, 115, 214, and 215 nonconductive. It will be seen that when the DC voltage is removed and the capacitor 47 and secondary 40 can no longer gate SCR 50 it will become nonconductive as the B phase voltage passes through zero and thus permit conduction of SCR 60. With SCR 60 conducting the SCR 27 will be held nonconductive at a time the B phase voltage reaches zero. Then thereafter with the SCR 27 nonconductive the next time the A phase voltages reaches zero A phase voltage to the load will be terminated since neither of the SCR's 14 or 15 can be provided with gating signals. In a similar manner the SCR's 150 and 250 will be rendered nonconductive due to the termination of current flow in transformer primary windings 21 and 121 and therefore the necessary gate signals for the SCR's 114, 115, 214, and 215 will be ended and all power to the output terminals will cease as the respective voltages reach their zero reference axes.

There has thus been described an improved polyphase power control system which operates to control the application of power from a polyphase power supply to a load, the arrangement being such that the power from each of the various phases of the polyphase power supply is initially provided to the load when the various voltages in the various phases crosses a zero reference axis. The system has been described with reference to a three phase power supply system but, of course, it will be obvious to those skilled in the art that the teachings hereof are adaptable to AC systems having various numbers of output phases. The system has also been described with reference to an advantageous and simplified DC control unit which cooperates with the A phase control network so that a common signal ground can be used for the main power supply and the DC control unit. It will be obvious to those skilled in the art that various modifications can be made in the system and thus it is intended that those modifications which will become obvious to a person skilled in the art as a result of the teachings hereof are encompassed by the following claims.

What is claimed is:

1. A current control system for a polyphase power supply having first, second, and third output circuits provided with phase displaced voltages comprising in combination: first controlled rectifier means connected in series circuit with said first output circuit of said power supply, said rectifier means having first control electrode means; second controlled rectifier means connected in series circuit with said second output circuit of said power supply, said second rectifier means having second control electrode means; first and second rectifier gating circuits respectively coupled with said first and second control electrode means for applying gating signals thereto to cause said first and second rectifier means to becomes conductive the next time the associated output circuit of said power supply passes through zero voltage following energization of the associated one of said first or second gating circuits; a first zero voltage detecting circuit coupled with said second one of said output circuits and with said first gating circuit to control energization of said first gating circuit, said detecting circuit including a signal input circuit and responding to an input control signal applied to said signal input circuit to render said first gating circuit operative when the voltage on said second output circuit passes through zero voltage; and a second zero voltage detecting circuit coupled with said third one of said output circuits and with said first and second gating circuits and responsive to operation of said first gating circuit to render said second gating circuit initially operative when the voltage of the output circuit to which said second detecting circuit is coupled next passes through zero following operation of said first gating circuit.

2. A control system as defined in claim 1 wherein said first gating circuit includes an operating circuit coupled with said second output circuit for receiving operating potential which is out of phase with respect to the potential of said first output circuit.

3. A control system as defined in claim 1 wherein said first gating circuit includes a third controlled rectifier having a control electrode coupled with said first zero voltage detecting circuit, and a transformer having a secondary winding coupled with said first control electrode means and a primary winding connected to said power supply and to said third controlled rectifier.

4. A control system as defined in claim 3 wherein said transformer has a second secondary winding and wherein said second zero voltage detecting circuit is coupled with said second secondary winding.

5. A control system as defined in claim 3 wherein said primary winding is connected to said second output circuit.

6. A control system as defined in claim 3 wherein said second gating circuit includes a fourth controlled rectifier having a control electrode coupled with said second zero voltage detecting circuit, and a second transformer having a secondary winding coupled with said second control electrode means and a primary winding connected to said power supply and to said fourth controlled rectifier.

7. A control system as defined in claim 6 wherein the windings on said transformers are wound in a manner to provide leading gate signals for said respective control electrode means.

8. A control system as defined in claim 1 wherein said system includes: third controlled rectifier means connected in series circuit with said third output circuit of said power supply and having a third control electrode means; a third controlled rectifier gating circuit coupled with said control electrode means of said third rectifier means; a third zero voltage detecting circuit coupled with said first output circuit and with said second and third rectifier gating circuits, said third detecting circuits being responsive to operation of said second gating circuit to render said third gating circuit initially operative when the voltage of said first output circuit next passes through zero.

9. A control system as defined in claim 8 wherein said first gating circuit includes a first transformer having a secondary winding coupled with the control electrode means of said first rectifier means and a primary winding coupled with said second signal output circuit; said second gating circuit includes a second transformer having a secondary winding coupled with the control electrode means of said second rectifier means and a primary winding coupled with said third output circuit; and said third gating circuit includes a third transformer having a secondary winding coupled with the control electrode means of said third rectifier means and a primary winding coupled with said first output circuit.

10. A control system as defined in claim 9 wherein said second voltage detecting circuit is coupled with said first gating circuit through a second secondary winding on said first transformer, and wherein said third voltage detecting circuit is coupled with said second gating circuit through a second secondary winding on said second transformer.

11. A control system as defined in claim 10 wherein each of said gating circuits includes a controlled rectifier respectively connected to the primary winding of the associated one of said transformers.

12. A control system as defined in claim 8 wherein each of said controlled rectifier means includes a pair of oppositely poled silicon controlled rectifiers.

13. A polyphase current control system comprising in combination: first and second current control means respectively connected in series circuit with first and second output circuits of first and second phases of a polyphase power supply, said first means being nonconductive and then rendered conductive in response to a first signal applied thereto during a first time interval and said second means being nonconductive and then rendered conductive in response to a second signal applied thereto during a second time interval; first zero voltage detecting means coupled with said first current control means and with said second output circuit; second zero voltage detection means coupled with said second current control means and with an output circuit of said power supply which is provided with a voltage which is out of phase with respect to said second output circuit; control signal input means coupled with said first zero voltage detecting means to apply an input signal thereto rendering said first zero voltage detecting means operable to apply said first signal to said first control means prior to said first time interval to render said first control means conductive when the voltage of said first phase next crosses a zero reference axis; and signal translating circuit means coupled with said first and second zero voltage detecting means rendering said second zero voltage detecting means operative in response to the occurrence of said first signal, said second zero voltage detecting means then operating to apply said second signal to said second current control means prior to said second time interval to render said second control means conductive when the voltage of said second phase next crosses a zero reference axis following the time when said second zero voltage detecting means is rendered operable.

14. A control circuit for a polyphase power supply having A, B, and C phase output circuits comprising: first, second, and third controlled rectifiers respectively connected to said A, B, and C phase circuits and each having a control electrode; first, second, and third transformers each having a primary winding respectively connected to said B, C, and A phase output circuits and each having a secondary winding respectively connected to the control electrode of said first, second, and third controlled rectifiers; first, second, and third current control circuit means respectively connected to said first, second, and third primary windings preventing the flow of current therethrough when the said associated circuit means is nonconductive and permitting the flow of current therethrough when the said associated circuit means is conductive; first, second and third zero voltage detecting circuit means respectively connected to said B, C, and A phase output circuits and respectively connected to said first, second, and third current control circuit means to hold said current control circuit means nonconductive until the voltage of the associated output circuit next passes through zero following the application of a first signal to the respective detecting circuit means; input signal control means connected to said first detecting circuit means for selectively applying a said first signal thereto; means including a secondary winding on said first transformer connected to said second detecting circuit means for applying a said first signal thereto when said primary winding of said first transformer is energized; and means including a secondary winding on said second transformer connected to said third detecting circuit means for applying a said first signal thereto when said primary winding of said second transformer is energized.

References Cited

UNITED STATES PATENTS

| | | | |
|---|---|---|---|
| 2,849,659 | 8/1958 | Kesselring. | |
| 3,237,030 | 2/1966 | Coburn | 307—136 X |
| 3,283,179 | 11/1966 | Carlisle et al. | 307—133 |
| 3,309,602 | 3/1967 | Euvino et al. | 307—133 X |

ORIS L. RADER, *Primary Examiner.*

T. B. JOIKE, *Assistant Examiner.*